US012349223B2

(12) United States Patent
Yeung et al.

(10) Patent No.: US 12,349,223 B2
(45) Date of Patent: Jul. 1, 2025

(54) REGULATING COMMUNICATION BETWEEN A VEHICLE AND A USER DEVICE

(71) Applicant: Rivian IP Holdings, LLC, Plymouth, MI (US)

(72) Inventors: Fai Yeung, Palo Alto, CA (US); Leonid Kokhnovych, Burnaby (CA); Zhenxiang Kui, Langley (CA); Wei Kuai, Surrey (CA); Paul Rolfe, Menlo Park, CA (US); Raymond Chan, Mountain View, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 423 days.

(21) Appl. No.: 17/991,252

(22) Filed: Nov. 21, 2022

(65) Prior Publication Data
US 2024/0172309 A1    May 23, 2024

(51) Int. Cl.
*H04W 76/10*    (2018.01)
*H04W 4/80*    (2018.01)
*H04W 76/18*    (2018.01)

(52) U.S. Cl.
CPC ................. *H04W 76/18* (2018.02)

(58) Field of Classification Search
CPC ..... H04W 76/18; H04W 76/10; H04W 88/02; H04W 4/80; H04B 3/544; H04B 7/18558
See application file for complete search history.

(56) References Cited

U.S. PATENT DOCUMENTS

| 7,613,136 | B2 * | 11/2009 | Daigle | H04L 43/0811 370/395.2 |
| 11,432,359 | B1 * | 8/2022 | Marupaduga | H04W 72/1263 |
| 2010/0097984 | A1 * | 4/2010 | Baghel | H04W 74/0866 370/328 |
| 2015/0043449 | A1 * | 2/2015 | Bangolae | H04W 76/27 370/329 |
| 2015/0117187 | A1 * | 4/2015 | Zhu | H04B 17/318 370/252 |
| 2016/0113047 | A1 * | 4/2016 | Chen | H04W 76/18 370/329 |
| 2016/0323921 | A1 * | 11/2016 | Thanayankizil | H04W 76/19 |

(Continued)

OTHER PUBLICATIONS

Welcome to Tesla Motors Club, Tesla, Available online at <https://teslamotorsclub.com/tmc/threads/cannot-reply-to-sms-using-iphone.203523/>, Aug. 16, 2020, 7 pages.

*Primary Examiner* — Andrew Wendell
(74) *Attorney, Agent, or Firm* — Haley Guiliano LLP

(57) ABSTRACT

Systems and methods are provided for initiating first instructions to establish a communication session between a user device and a vehicle, wherein the first instructions include a wait time interval and the communication session is associated with a short-range wireless communication protocol. The system and methods may determine a number of unsuccessful attempts for establishing the communication session exceeds a threshold value, and in response to determining that the number exceeds the threshold value, generate second instructions to establish the communication session, wherein the second instructions include a modification to the wait time interval. The second instructions may be initiated to establish the communication session between the user device and the vehicle.

20 Claims, 5 Drawing Sheets

(56) References Cited

U.S. PATENT DOCUMENTS

| | | | | |
|---|---|---|---|---|
| 2018/0199385 A1* | 7/2018 | Ramkull | ............... | H04W 36/08 |
| 2018/0376375 A1* | 12/2018 | Turtinen | ............... | H04W 28/18 |
| 2020/0084634 A1* | 3/2020 | Ohlsson | .............. | H04W 12/106 |
| 2022/0303793 A1* | 9/2022 | Patil | ...................... | H04W 24/04 |

* cited by examiner

300

| Time stamp | Parameters | Wait time interval | Successful connection? |
|---|---|---|---|
| 310 November 1 2:01:17.415 | #count: 5 #retries:4 #elapsedTime: 8 | 8 seconds | Yes |
| 308 November 1 1:53:17.415 | #count: 4 #retries:3 #elapsedTime: 7 | 7 seconds | No |
| 306 November 1 1:46:17.415 | #count: 3 #retries:2 #elapsedTime: 3 seconds | 3 seconds | No |
| 304 November 1 1:43:31.415 | #count: 2 #retries: 1 #elapsedTime: 0 seconds | 0 | No |
| 302 November 1 1:43:31.315 | #count: 1 #retries:0 #elapsedTime:0 | 0 | No |

FIG. 3

REGULATING COMMUNICATION BETWEEN A VEHICLE AND A USER DEVICE

INTRODUCTION

The present disclosure is directed to intelligently managing the process of establishing a connection over a short-range wireless communication (e.g., Bluetooth®) protocol between a user device (e.g., a mobile device or a key fob) and a vehicle.

SUMMARY

In an un-regulated Bluetooth reconnection set up, it may take multiple attempts for a Bluetooth connection to be established between a mobile device and a vehicle. A mobile application running on the mobile device often requests for a new connection retry immediately after a connection error indication is received, without any wait time, and the mobile device may continuously attempt to connect to the vehicle without stopping, thereby draining battery power of the mobile device and causing the mobile device to remain in a stalled or deadlocked state.

The systems and methods disclosed herein may allow for regulating Bluetooth Low Energy (BLE), or regulating other short-range wireless communication protocols, such as, for example, by regulating re-connection attempts between a user device and a vehicle, to improve an overall rate of successful connection, detect conditions when multiple re-connection attempts fail, and prompt the user only when connection stalling is detected (or perform a reset programmatically). Such aspects may provide the ability to throttle the reconnect attempts in the face of a connection failure, and provide the user with a more robust and pleasant experience for using the mobile device as a key for an electric vehicle, and help conserve the battery power of, and/or network resources consumed by, the mobile device.

The systems and methods disclosed herein may comprise processing circuitry configured to initiate first instructions to establish a communication session between a user device and a vehicle, wherein the first instructions include a wait time interval and the communication session is associated with a short-range wireless communication protocol. The processing circuitry may be further configured to determine a number of unsuccessful attempts for establishing the communication session exceeds a threshold value, and in response to determining that the number exceeds the threshold value, generate second instructions to establish the communication session, wherein the second instructions include a modification to the wait time interval. The processing circuitry may be further configured to initiate the second instructions to establish the communication session between the user device and the vehicle.

In some embodiments, such features may enable the provided systems and methods to regulate BLE (or other short-range wireless communication protocols) re-connection attempts to improve the overall rate of successful connection, detect the conditions when multiple re-connection attempts fail, and prompt the user only when connection stalling is detected (or perform the reset programmatically). Such aspects may provide the ability to throttle the reconnect attempts in the face of a connection failure, and provide the user with a more robust and pleasant experience for using the mobile device as a key for an electric vehicle, and help conserve the battery power of, and/or network resources consumed by, the mobile device.

In some embodiments, the processing circuitry may be configured to perform the modification to the wait time interval included in the second instructions by determining a randomized amount of time associated with the wait time interval.

In some embodiments, the processing circuitry may be configured to perform the modification to the wait time interval included in the second instructions by selecting a particular wait time interval from among a plurality of predetermined wait time intervals.

In some embodiments, the processing circuitry may be configured to perform the modification to the wait time interval included in the second instructions by increasing an amount of time associated with the wait time interval.

In some embodiments, the processing circuitry may be further configured to determine that a vehicle sensor is not connected to the user device over the short-range wireless communication protocol, and in response to determining that the vehicle sensor is not connected to the user device over the short-range wireless communication protocol, automatically reset a module associated with the short-range wireless communication protocol.

In some embodiments, the processing circuitry may be further configured to determine that a vehicle sensor is not connected to the user device over the short-range wireless communication protocol, and in response to determining that the vehicle sensor is not connected to the user device over the short-range wireless communication protocol, generate for display a prompt requesting a user to select an option to reset a module associated with the short-range wireless communication protocol.

In some embodiments, the processing circuitry may be further configured to monitor user interactions with displayed prompts that request the user to select the option to reset the module associated with the short-range wireless communication protocol, and determine whether to provide, or a manner of providing, the displayed prompts based on the user interactions.

In some embodiments, the modification to the wait time interval included in the second instructions is further performed in response to determining that each of the unsuccessful attempts have occurred within a particular time period.

In some embodiments, a non-transitory computer-readable medium may be provided having non-transitory computer-readable instructions encoded thereon that, when executed by a processor, causes the processor to initiate first instructions to establish a communication session between a user device and a vehicle, wherein the first instructions include a wait time interval and the communication session is associated with a short-range wireless communication protocol. The processor may be configured to determine a number of unsuccessful attempts for establishing the communication session exceeds a threshold value. The processor may be further configured to, in response to determining that the number exceeds the threshold value, generate second instructions to establish the communication session, wherein the second instructions include a modification to the wait time interval. The processor may be further configured to initiate the second instructions to establish the communication session between the user device and the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 3 shows an illustrative access log of short-range wireless communication connection attempts, in accordance with some embodiments of the present disclosure;

DETAILED DESCRIPTION

Figure 1:
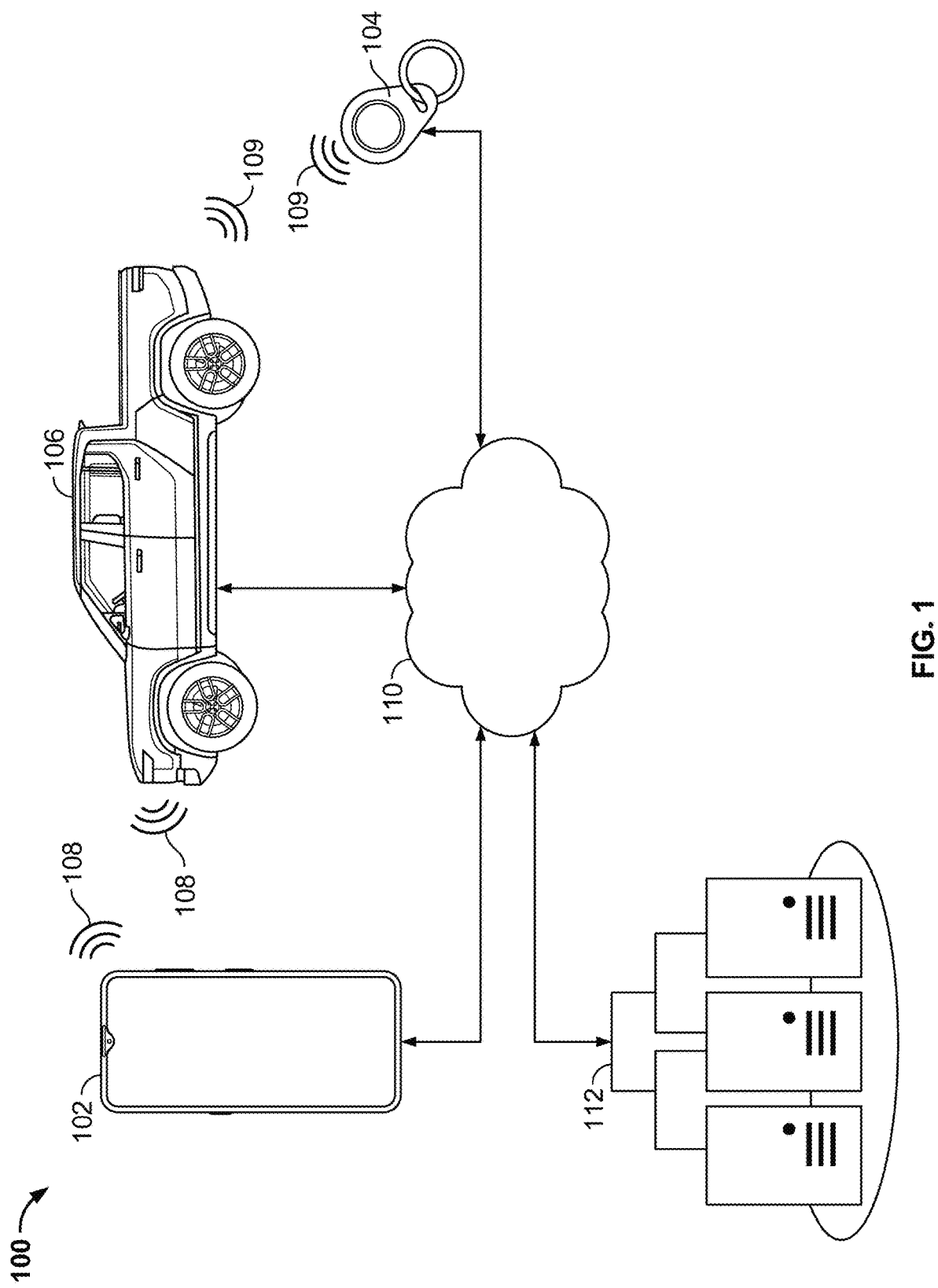
FIG. 1 shows a block diagram of components of a system configured to establish a communication session between a user device and a vehicle, in accordance with some embodiments of the present disclosure.

FIG. 1 shows a block diagram of components of a system configured to establish a communication session between a user device and a vehicle, in accordance with some embodiments of the present disclosure. System 100 may comprise vehicle 106, one or more of user device 102 (e.g., a mobile device, such as, for example, a smart phone or a tablet or any other suitable user device or any combination thereof) and user device 104 (e.g., a key fob), and cloud computing resources 112 (e.g., one or more servers, which may include or be in communication with one or more databases). Such elements of system 100 may be configured to communicate over a first communication path and/or a second communication path. The first communication path may be associated with, e.g., a short-range radio communication technique, such as, for example, Bluetooth low energy (BLE) 108 or near-field communication (NFC) 109. The second communication path may be associated with network 110, e.g., the Internet, a local area network, a wide area network, a satellite network and/or any other suitable network. User device 102 and/or 104 may be operable by a user to perform, or instruct performance of, various functions in connection with vehicle 106 (e.g., unlocking and locking doors or hatches, pairing to a media system of vehicle 106, starting or turning off vehicle 106, signaling a panic condition, and/or any other suitable functions) over the first communication path. In some embodiments, user device 102 may be configured to implement a phone-as-key (PAK) feature over a short-range wireless communication technique.

Figure 2:
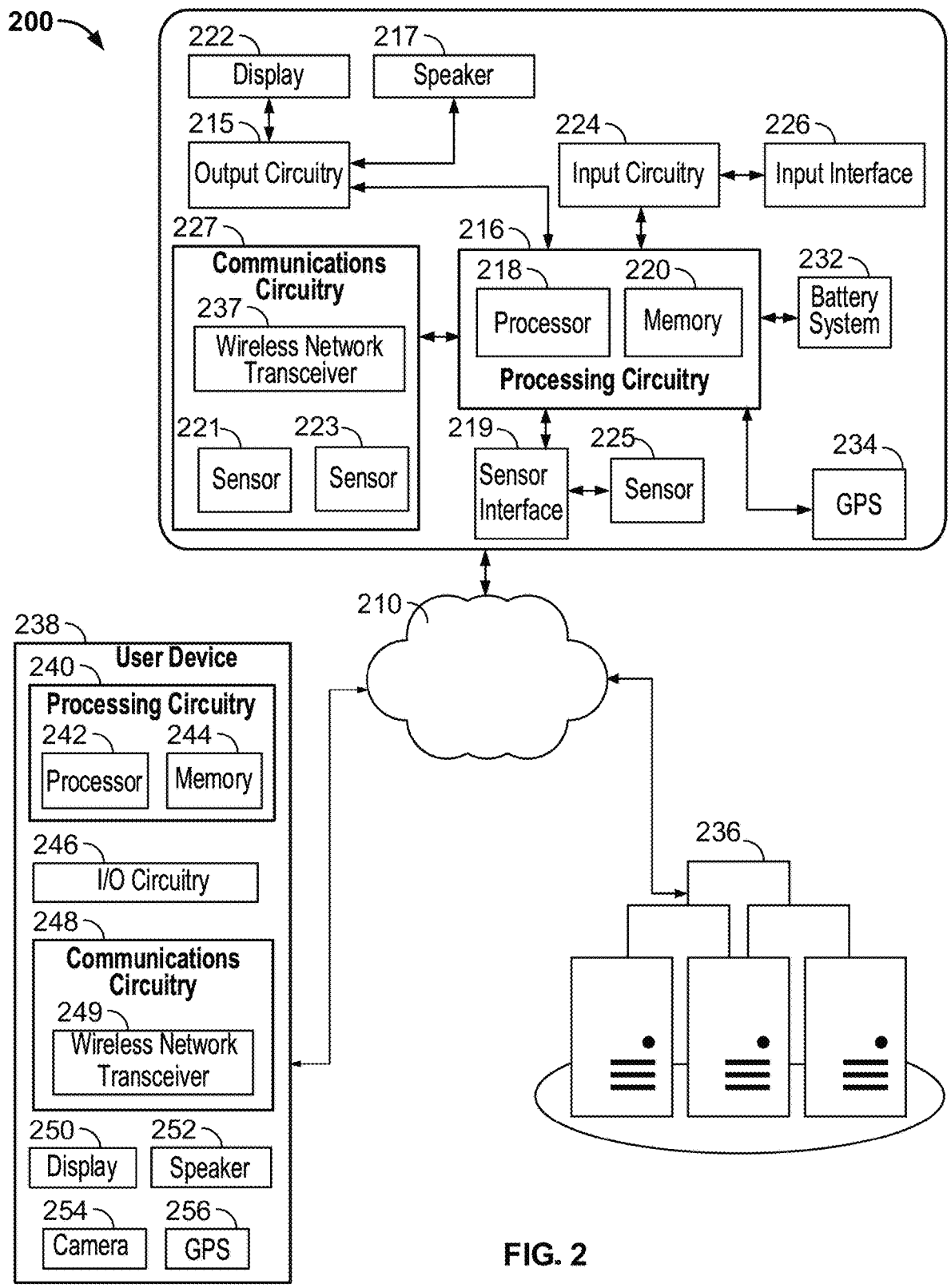
FIG. 2 shows a block diagram of components of a system configured to establish a communication session between a user device and a vehicle, in accordance with some embodiments of the present disclosure.

FIG. 2 shows a block diagram of components of a system 200 configured to establish a communication session between a user device and a vehicle, in accordance with some embodiments of the present disclosure. System 200 may comprise vehicle 206, which may be in communication with server 236 and user device 238 via one or more networks 205 and/or short-range wireless communication techniques and/or wired techniques. In some embodiments, vehicle 206 may correspond to vehicle 106 of FIG. 1, and user device 238 may correspond to user device 102 (e.g., a mobile device, such as, for example, a smartphone) or user device 204 (e.g., such as, for example, a key fob).

Vehicle 206 may be a car (e.g., a coupe, a sedan, a truck, an SUV, a bus), a motorcycle, an aircraft (e.g., a drone), a watercraft (e.g., a boat), or any other type of vehicle or any combination thereof. In some embodiments, vehicle 206 may be configured to operate autonomously or semi-autonomously. Vehicle 206 may comprise processing circuitry 216 which may comprise processor 218 and memory 220. Processor 218 may comprise a hardware processor, a software processor (e.g., a processor emulated using a virtual machine), or any combination thereof. In some embodiments, processor 218 and memory 220 in combination may be referred to as processing circuitry 216 of vehicle 206. In some embodiments, processor 218 alone may be referred to as processing circuitry 216 of vehicle 206. Memory 220 may comprise hardware elements for non-transitory storage of commands or instructions, that, when executed by processor 218, cause processor 218 to operate vehicle 206 in accordance with embodiments described above and below. Processing circuitry 216 may be communicatively connected to components of vehicle 206 via one or more wires, or via wireless connection.

In some embodiments, processing circuitry 216 (and/or processing circuitry 240 of user device 238 and/or processing circuitry of one or more servers 236) may be configured to execute computer-readable instructions to regulate the process of establishing a communication session between user device 238 and vehicle 206. For example, user device 138 may be configured to execute a mobile application (e.g., a vehicle application provided by or otherwise associated with a manufacturer of vehicle 206) to perform the techniques described above and below.

Processing circuitry 216 may be communicatively connected to input interface 226 (e.g., a steering wheel, a touch screen display, buttons, knobs, a microphone or other audio capture device, or any other suitable input interface or any combination thereof) via input circuitry 224. In some embodiments, a driver or operator or passenger of vehicle 206 may be permitted to select certain settings and/or provide other input in connection with the operation of vehicle 206 via input interface 226. For example, input interface 226 may receive input (e.g., tactile, voice, haptic, biometric or any other suitable input) or a request (e.g., from user device 238) to pair vehicle 206 and user device 238. In some embodiments, input interface 226 may be communicatively connected to one or more cameras (and/or any other suitable types of sensors), which may be configured to capture data related to an internal or external environment of vehicle 206. Such images may be transmitted to processing circuitry 216 and used to, e.g., detect obstacles or vehicles in a vicinity of vehicle 206, for facial recognition purposes to authenticate a driver of vehicle 206, and/or for any other suitable purpose.

Processing circuitry 216 may be communicatively connected to display 222 and speaker 217 by way of output circuitry 215. Display 222 may be located at a dashboard of vehicle 206 and/or at a heads-up display at a windshield of vehicle 206. Display 222 may comprise an LCD display, an OLED display, an LED display, a touch screen display, or any other type of display or any combination thereof. Speaker 217 may be located at any location within the cabin of vehicle 206, e.g., at the dashboard of vehicle 206, on an interior portion of the vehicle door, etc., and may be configured to provide audio output to a driver of vehicle 206.

In some embodiments, processing circuitry 216 may be communicatively connected to GPS 234 or other positioning device of vehicle 206, where the driver or operator or passenger may interact with the GPS system via input interface 116. GPS 234 may be in communication with multiple satellites and/or servers 136 remote from vehicle 206 to ascertain the location of vehicle 206 and provide navigation directions to processing circuitry 216. As another example, the positioning device may operate on terrestrial signals, such as cell phone signals, Wi-Fi signals, or ultra-wideband signals to determine a location of vehicle 206.

Processing circuitry 216 may be communicatively connected to communications circuitry 227. Communications circuitry 227 may comprise wireless network transceiver 237 which may comprise any suitable hardware and/or software operable to send and receive wireless (and/or wired) signals between vehicle 206 and external devices such as, for example, network or user devices (e.g., user device 238, server 236 and/or a Wi-Fi access point and/or a satellite) and/or any other suitable computing devices. Communications circuitry 227 may include or be associated with an antenna and other control circuitry (e.g., protocol converters, rate converters, signal converters), or any combination thereof. Wireless network transceiver 237 may comprise one or more components to facilitate communication over any suitable network or communication method (e.g., the Internet, short-range radio communication such as, for example, Bluetooth, BLE, NFC, etc.). For example, communications circuitry 227 may be configured to access the Internet, a local area network, a wide area network, a Bluetooth-enabled device, an NFC-enabled device, any other suitable device using any suitable protocol, or any combination thereof. In some embodiments, communications circuitry 227 may comprise a sensor configured to advertise a vehicle identifier (e.g., over a BLE link). In some embodiments, communications circuitry 227 may comprise multiple different communications circuits, each being respectively configured to facilitate a different type of communication.

In some embodiments, communications circuitry 227 or wireless network transceiver 237 may comprise sensors 221 and 223. In some embodiments, sensor 221 may correspond to a driver's left front door sensor, operable to communicate whether such door is open and/or which may transmit data to or wireless network transceiver 237 indicative of whether sensor 221 is connected to user device 238 via a short-range wireless communication protocol. In some embodiments, sensor 223 may correspond to a sensor in the vehicle's center console which may transmit data to or wireless network transceiver 237 indicative of whether sensor 223 is connected to user device 238 via a short-range wireless communication protocol.

Processing circuitry 216 may be communicatively connected (e.g., by way of sensor interface 219) to any suitable number and types of sensors. In some embodiments, any suitable number of sensor 225 may be may be positioned at a variety of locations of vehicle 206, and may be one or more of a variety of types, e.g., an image sensor, an ultrasonic sensor, a radar sensor, LED sensor, LIDAR sensor, etc., configured to measure the distance between vehicle 206 and an object in a surrounding environment of the vehicle (e.g., by outputting a light or radio wave signal, and measuring a time for a return signal to be detected and/or an intensity of the returned signal, and/or performing image processing on images captured by the image sensor of the surrounding environment of vehicle 206).

Processing circuitry 216 may be communicatively connected to battery system 232, which may be configured to provide power to one or more of the components of vehicle 206 during operation. In some embodiments, vehicle 206 may be an electric vehicle or a hybrid electric vehicle. It should be appreciated that FIG. 2 only shows some of the components of vehicle 206, and it will be understood that vehicle 206 also includes other elements commonly found in vehicles (e.g., electric vehicles), e.g., a motor, brakes, wheels, wheel controls, turn signals, windows, doors, etc.

User device 238 may be, for example, a smartphone, tablet, a key fob, or any suitable personal computing device operable to communicate with vehicle 206 and server 236, e.g., by way of communications circuitry 248. In some embodiments, user device 238 may be configured to communicate with vehicle 206 by way of a wired connection (e.g., USB connection or other data cable).

User device 238 may comprise processing circuitry 240, processor 242, memory 244, which may be implemented in a similar manner as processing circuitry 216, processor 218 and memory 220, respectively. User device 238 may further comprise input/output (I/O) circuitry 246 (e.g., coupled to a microphone and/or a touch screen and/or other suitable inputs), communications circuitry 248, display 250, speaker 252, camera 254 and GPS system 256, which may be implemented similarly to input circuitry 224 and output circuitry 215, communications circuitry 248, display 222, speaker 217 images sensor(s) coupled to sensor interface 219, and GPS 234, respectively.

Communications circuitry 248 may comprise wireless network transceiver 249 which may comprise one or more components configured to receive and transmit signals using various communication techniques. For example, comprise a wireless network transceiver 249 may enable user device 238 to communicate with vehicle 206 over a first communication path (e.g., BLE, NFC or other short-range communication technique) and communications circuitry 248 may enable user device 238 to communicate with server 236 over a second communication path (e.g., network 210, such as, for example, the Internet, a satellite network, or any other suitable network, or any combination thereof). In some embodiments, communications circuitry 227 may comprise multiple different communications circuits, each being respectively configured to facilitate a different type of communication.

In some embodiments, user device 238 may be a key fob which may comprise one or more buttons or other features for receiving haptic input or other suitable input from a user. For example, in some embodiments, the key fob comprises a number of buttons (e.g., two, three, four, or more than four buttons) that respectively correspond to a function or command. The key fob may include a battery to provide electrical power, an antenna for transmitting and receiving signals, and processing circuitry 240 may convert user selections (e.g., presses of a button) to an electrical signal which may then be converted to a wireless signal (e.g., via the antenna).

Server 236 may comprise a plurality of servers configured to remotely provide cloud computing resources (e.g., storage, processing, software applications, or any other suitable resources, or any combination thereof) to other components of system 200, e.g., user device 238 and/or vehicle 206. In some embodiments, server 236 may be associated with a manufacturer of vehicle 206, and may be configured to store (e.g., a cloud-based storage system such as in memory 278 or a database associated with server 236) information related to each vehicle sold by the manufacturer and related to an owner of each vehicle, e.g., login credentials associated with a user profile of the vehicle owner with the manufacturer, which may be generated for and provided to the user upon his or her purchase of vehicle 206. Such information may be stored in any suitable format such as, for example, a database, a lookup table, a set of flags, one or more ASCII characters or words (e.g., in a text file), any other format, or any combination thereof.

The mobile application, e.g., executing at least in part on user device 238, may be configured to initiate first instructions to establish a communication session between user device 238 and vehicle 206. In some embodiments, the first instructions may be transmitted from user device 238 over a short-range wireless communication protocol, e.g., BLE or any other suitable wireless or wired protocol. In some embodiments, the first instructions are transmitted during an initial setup of configuring user device 238 as a key for vehicle 206, or after user device 238 has already been configured to act as a key for vehicle 206 (e.g., when a user of user device 238 is approaching or is inside vehicle 206). The first instructions may be initiated automatically, e.g., by the mobile application and/or an operating system (OS) of user device 238, or based on a user request.

In some embodiments, the first instructions to establish a communication session between user device 238 and vehicle 206 may be a pairing or bonding request. Pairing may be understood as a temporary connection state that may not continue across subsequent connections, whereas bonding may be understood as a connection state that continues across subsequent connections, e.g., the pairing step may be skipped subsequent to bonding being established. In some embodiments, the pairing or bonding request may be permitted or initiated based on user device 238 being enrolled or registered in association with vehicle 206.

In some embodiments, the first instructions may be implemented by the mobile application. In some embodiments, the OS of user device 238 may implement the first instructions to request to establish a communication session between user device 238 and vehicle 206. For example, the mobile application may control the operating system to initiate a connection or request the OS to make the connection, and/or request current reconnection attempt data from the OS. In some embodiments, the mobile application may specify how many reattempts should be carried out and/or a wait time interval at which such attempts should be carried out. The OS can be any operating system that supports the basic functions of user device 238 for executing application programs and hardware interfaces and providing basic services and information these programs use when running, and may be operable to initialize and control the various software and/or hardware components of user device 238.

In some embodiments, to establish a connection over the short-range wireless communication protocol, user device 238 may transmit a beacon or advertising packet (e.g., comprising an indication of a user device ID) to vehicle 206 at repeated intervals, or vehicle 206 may transmit a beacon or advertising packet (e.g., comprising an indication of a vehicle ID) to user device 238 at repeated intervals. In some embodiments, the vehicle ID may be received at server 236 (e.g., during manufacturing of vehicle 206), and the vehicle ID may be utilized in initiating a connection between user device 302 and vehicle 206. The advertising packet or other data packet which may be transmitted by vehicle 206 may comprise identifiers of services supported by vehicle 206. The advertising packet may enable vehicle 206 to discover user device 238, and/or may enable user device 238 to discover vehicle 206. In some embodiments, user device 238 may be configured to receive data from vehicle 206 using the short-range wireless communication protocol indicative of whether a particular sensor (e.g., sensor 221 and/or 223 of FIG. 2) is connected via such protocol.

In some embodiments, the first instructions may include a wait time interval. In some embodiments, the wait item interval may comprise an explicit instruction to wait a certain amount of time (e.g., 0.3 seconds or any other suitable time interval) prior to a reconnection attempt to initiate a connection between user device 238 and vehicle 206. In some embodiments, the wait item interval may comprise a lack of an explicit instruction, e.g., the first instructions including the wait time interval may comprise not specifying a wait time interval, in which case the wait time may revert to a default wait time interval (e.g., having a value of zero or any other suitable value). In some embodiments, the wait time interval may be set by the mobile application automatically, may be set based on an input received from a user, or may be set the OS of user device 238, by vehicle 206, or any combination thereof. In some embodiments, an indication of the wait time interval may be stored in memory 244 or any other suitable memory, or may be determined dynamically. In some embodiments, the reconnection attempts may be initiated by the mobile application and/or the OS of user device 238.

In some embodiments, the mobile application may determine that a number of unsuccessful attempts for establishing the communication session with vehicle 206 over the short-range wireless communication protocol exceeds a threshold value. In some embodiments, the threshold value may be set by the mobile application automatically, may be set based on an input received from a user, or may be set by the OS of user device 238, by vehicle 206, or any combination thereof. In some embodiments, the threshold value may be stored in memory 244 or any other suitable memory, or may be determined dynamically. For example, as shown in FIG. 3, the mobile application may access log 300 of short-range wireless communication connection attempts to determine a number of reconnection attempts that have occurred recently, such as, for example, within a certain time period (e.g., over the last 15 seconds or any other suitable time period), and may compare the determined number to the threshold value. In some embodiments, log 300 may be maintained by the OS of user device 238 and/or the mobile application executing at least in part on user device 238. For example, the mobile application may request data associated with log 300 from the OS, and/or maintain the data associated with log 300. In some embodiments, the reconnection attempts may be initiated by the mobile application and/or the OS of user device 238. For example, the mobile application may specify number of reattempts that should be carried out (e.g., in the ordinary way the OS carries out such attempts) prior to performing modification of the wait time interval.

As shown in log 300 of FIG. 3, the mobile application may determine various parameters, such as for example, a time stamp associated with each connection attempt; a #count parameter (e.g., based on a counter function which may be utilized by the mobile application and/or OS of user device 238) corresponding to a number of connection attempts belonging to a particular session; a #retries or #reattempts parameter corresponding to a number of retried or reattempted connection requests; and an elapsed time during which the counts and retries are attempted. In the example of FIG. 3, the mobile application may specify a default value of, e.g., 0, for the wait time interval of the first two attempts indicated at 302 and 304 (or the mobile application may not specify such value, which may cause the wait time interval to revert to the default value). The mobile application may determine, as indicated in the right-hand column of log 300, that such attempts did not establish a stable connection between user device 238 and vehicle 206. In some embodiments, log 300 may specify a particular sensor of vehicle 206 (e.g., 221 or 223) to which the connection was attempted. In some embodiments, time that elapses during connection attempts may be included or excluded from log 300 and subsequent calculations.

In the example of FIG. 3, the mobile application may determine that a threshold number of attempts is two, and thus that for the third attempt (and second reattempt) indicated at 306, the wait time interval should be modified, based on any of the techniques described herein. For example, as indicated in log 300 in association with 306, the wait time interval may be modified to three seconds; however, such attempt may also be unsuccessful in establishing a connection. In some embodiments, the mobile application may enable the OS to select wait time intervals for attempts when the number of attempts does not exceed the threshold, or may otherwise use default wait time intervals for such attempts.

As indicated at 308, the mobile application may cause the wait time interval to be further modified to, e.g., 7 seconds, but the attempt associated with such wait time interval may not be successful. As indicated at 310, the mobile application may thus further modify the wait time interval, e.g., to 8 seconds, as indicated at 310. The mobile application may receive an indication that the reattempt indicated at 310 was successful, and user device 238 may utilize such connection to transmit and receive data from vehicle 206. In some embodiments, the one or more of the #count and #retries parameters may be reset to zero after a successful connection is established. In some embodiments, log 300 may correspond to any suitable data structure, and may be utilized by the mobile application to incorporate previous events into decision making with respect to modifying and selecting wait time intervals between connection attempts.

Such aspects, which in some embodiments may be referred to as a BLE reconnection regulation algorithm, may be used to pace out the user device's 238 re-connection attempts to vehicle sensors, e.g., based on frequency, wait time intervals between each new attempt, and/or any other suitable configurable parameters. This may help resolve data traffic congestion issues when BLE stacks (e.g., software programs and tools underlying and helping to facilitate the functionality of BLE communications) are not ready for a new connection attempt before the last connection session has been processed and cleared out already.

If the mobile application determines that number of unsuccessful attempts for establishing the communication session exceeds the threshold value, the mobile application may generate second instructions to establish the communication session, wherein the second instructions include a modification to the wait time interval. In some embodiments, the mobile application may determine any suitable number of parameters (e.g., various times between, or an average time between, the failed attempts and/or any other suitable parameters), in addition or alternative to the number of reconnection attempts, in determining whether to generate the second instructions. The mobile application may then be configured to initiate the second instructions to establish the communication session between the user device and the vehicle. Such features may enable automatically regulating the reconnection attempts to prevent a stalled short-range communication protocol stack and battery drain of user device 238 (e.g., based on repeated unregulated reconnection attempts), to enhance the likelihood of a successful reconnection attempt to establish a stable connection between user device 238 and vehicle 206. In some embodiments, the reconnection attempts may be initiated by the mobile application and/or the OS of user device 238 (e.g., the mobile application may instruct the OS to conduct a certain number of reattempts).

In some embodiments, the modification to the wait time interval included in the second instructions comprises determining a randomized amount of time associated with the wait time interval, and causing user device 238 to wait for such randomized amount of time to expire prior to a next reconnection attempt with vehicle 206. For example, a randomized amount of time between 1 millisecond and 30 milliseconds, or between one second and 30 seconds, may be selected. In some embodiments, the first reconnection attempt, or a threshold number of reconnection attempts (e.g., 3 or any other suitable number), may be associated with the default wait time interval (e.g., having a value of zero seconds), and a delay M may be introduced after the reconnection attempts have consecutively failed. In some embodiments, a delay parameter T may be determined based on a mean value of a Gaussian-based random number generator, or using any other suitable random number generation technique, and thus an actual delay value may not be a constant value. In some embodiments, the mean value, T in, for the Gaussian random number generator may correspond to the wait time parameter input from configuration.

In some embodiments, the modification to the wait time interval included in the second instructions comprises selecting a particular wait time interval from among a plurality (e.g., 3 or 4 or 5 any other suitable number) of predetermined wait time intervals, and causing user device 238 to wait for such particular wait time interval to expire prior to a next reconnection attempt with vehicle 206. In some embodiments, the modification to the wait time interval included in the second instructions comprises increasing an amount of time associated with the wait time interval, and causing user device 238 to wait for such increased amount of time to expire prior to a next reconnection attempt with vehicle 206. In some embodiments, at least one modification may correspond to decreasing the wait time interval.

In some embodiments, in modifying the wait time interval included in the second instructions, the mobile application may analyze a velocity associated with the failed reconnection attempts. In some embodiments the velocity may correspond to a number of retries divided by a moving window size. In some embodiments, the velocity may alternatively be referred to as a retry rate. In some embodiments, the mobile application may determine whether the number of reattempts or retries is greater than or equal to a threshold number, and may determine whether such reattempts corresponds to a same session, which may correspond to the moving window size.

For example, if velocity is low, the mobile application may determine to slowly increase the wait time interval, as the wait time intervals associated with the failed attempts have not been sufficient to establish a stable connection. On the other hand, if velocity is relatively high, the mobile application may determine whether to modify the wait time interval (e.g., if the reconnection attempts are below a threshold), or whether to automatically reset the BLE module or prompt the user to reset the BLE module (e.g., if the reconnection attempts exceed a threshold). As an example, if the user is walking around his or her home near the garage where his or her vehicle is parked, there may be a number of reconnection attempts while the user is near the garage, but there may be a low velocity associated with such reconnection attempts since the user may leave the area surrounding the garage (and subsequently return, thus spreading out reconnection attempts over a longer time period contributing to a determination that the attempts belong to different sessions). On the other hand, a number of attempts determined to be part of a same session or instance which may result in a higher velocity determination.

In some embodiments, the mobile application may take into account any suitable contextual information in determining whether and how to modify the wait time interval. For example, if the mobile application determines (e.g., based on communicating with a weather application or web site) that it is currently raining, the mobile application may take into account that more attempts may be required (due to rain droplets potentially absorbing radio waves of the short-range wireless communication protocol) when setting the wait time interval, as compared to a day with no precipitation. Taking into account contextual information is discussed in more detail in application Ser. No. 17/852,042 to Yeung et al., the disclosure of which is hereby incorporated by reference herein in its entirety.

In some embodiments, if re-connection is not successful after numerous (e.g., more than a threshold number of) reconnection attempts, and/or after a certain amount of time has passed since attempting to connect user device 238 and vehicle 206 (and/or based on any other suitable criteria), the mobile application may determine that a short-range wireless communication protocol (e.g., BLE or any other suitable protocol) stack should be reset to rectify the connection issue. In this instance, the mobile application and/or an OS of user device 238 may be caused to programmatically reset the BLE stack. Alternatively, the mobile application and/or an OS of user device 238 may be caused to prompt the user to manually reset the BLE stack of user device 238, e.g., by turning the Bluetooth module in settings provided by user device 238 off and then back on. In some embodiments, the automatic reset of the Bluetooth module, or prompting the user to perform such reset, may be performed based on the mobile application determining that one or more sensors (e.g., sensors 221 and/or 223 of FIG. 2) included in vehicle 206 are not connected to user device 238 via the short-range wireless communication protocol. In some embodiments, the automatic reset of the Bluetooth module, or prompting the user to perform such reset, may be performed as an alternative to, or in addition to, performing a modification of the wait time interval of the second instructions.

In some embodiments, the mobile application may learn user preferences with respect to a wait time interval, or automatic or manual selection to reset a module associated with BLE or other protocol in association with user device 238. For example, the mobile application may receive explicit input specifying preferences of the user, or monitor historical habits of the user over time to determine user preferences based on user interactions and behaviors. In some embodiments, the mobile application may reference prior instances of connection attempts, e.g., based on a saved session state (UUID) and associated timestamps, and identify triggering conditions and/or a number of #retries associated with the saved session data, to determine if the historical data of one or more sessions may be relevant to a current instance of reconnection attempts. As an example, if in a prior reconnection attempt session, a certain wait time interval used in a certain environment (e.g., by a same or other user(s) having a user device and/or vehicle with similar characteristics) was successful, such wait time interval may be used at a current time. In some embodiments, historical results with respect to a certain velocity may be referenced and utilized in connection with a current session where connections are being reattempted. As another example, if a user frequently dismisses prompts to manually reset the BLE stack and does not take any action based on the suggestion in the prompts, the mobile application may determine to automatically perform such a reset and stop providing notifications, provided the OS provides for such an automatic reset of the BLE module.

In some embodiments, user preferences may be modeled in a graph representation of states when a user makes a decision, and each decision may be tracked until the mobile application determines that there is enough confidence in a recommendation engine for the algorithm to make a suggestion to the user or perform another action in connection with the session in which attempted connections are being made. For example, a particular action may be caused to occur if an automated condition is detected, e.g., the presence of state A, B and C and a count being less than or equal to a threshold (e.g., 5 or another suitable threshold).

Figure 4:
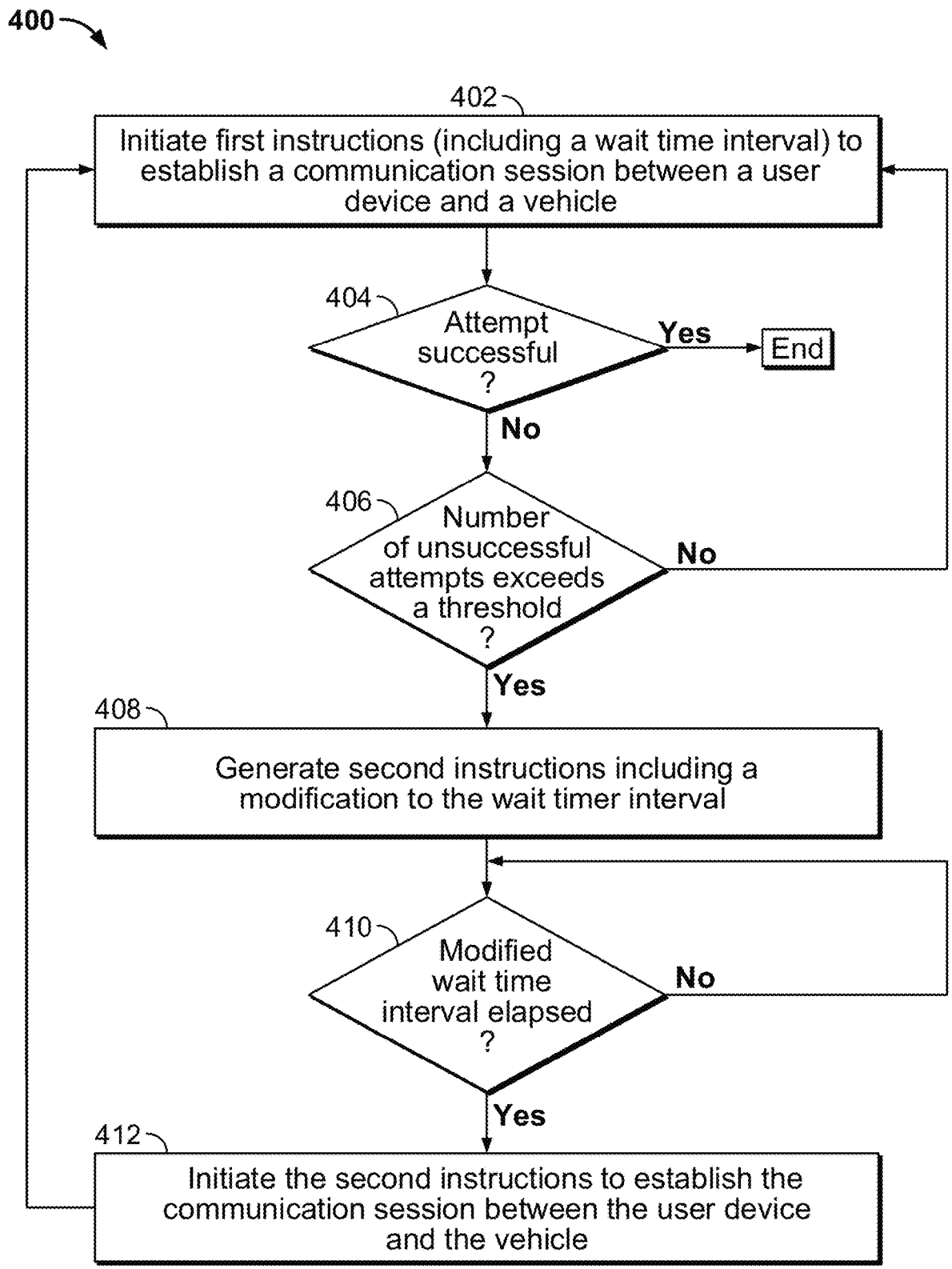
FIG. 4 shows a flowchart of illustrative process for establishing a communication session between a user device and a vehicle, in accordance with some embodiments of the present disclosure.

FIG. 4 shows a flowchart of illustrative process 400 for establishing communications between a user device and a vehicle, in accordance with some embodiments of the present disclosure. Process 400 may be executed at least in part by processing circuitry 216, processing circuitry 240 and/or server 236.

At 402, the processing circuitry may initiate first instructions including a wait time interval to establish a communication session between user device 238 and vehicle 206. In some embodiments, the first instructions may be transmitted from user device 238 over a short-range wireless communication protocol, e.g., BLE or any other suitable wireless or wired protocol. In some embodiments, the first instructions are transmitted during an initial setup of configuring user device 238 as a key for vehicle 206, or after user device 238 has already been configured to act as a key for vehicle 206 (e.g., when a user of user device 238 is approaching or is inside vehicle 206). The first instructions may be initiated automatically, e.g., by the mobile application and/or an operating system (OS) of user device 238, or based on a user request.

In some embodiments, the wait item interval may comprise an explicit instruction to wait a certain amount of time (e.g., 0.3 seconds or any other suitable time interval) prior to a reconnection attempt to initiate a connection between user device 238 and vehicle 206. In some embodiments, the wait item interval may comprise a lack of an explicit instruction, e.g., the first instructions including the wait time interval may comprise not specifying a wait time interval, in which case the wait time may revert to a default wait time interval (e.g., having a value of zero or any other suitable value). In some embodiments, the wait time interval may be set by the mobile application automatically (e.g., without requiring user input), may be set based on an input received from a user, or may be set the OS of user device 238, by vehicle 206, or any combination thereof.

At 404, the processing circuitry may determine whether the attempt to establish the communication session between user device 238 and vehicle 206 was successful. For example, processing circuitry 240 of user device 238 may determine whether data has been received from vehicle 206 indicating that a successful connection has been established (or data not received and expected to be received in the event of a successful connection, or data indicating the connection was unsuccessful such as, for example, an error code). An affirmative determination at 404 may end process 400. On the other hand, a negative determination at 404 may cause processing to proceed to 406.

At 406, the processing circuitry may determine whether a number of unsuccessful attempts for establishing the communication session exceeds a threshold value. In some embodiments, the processing circuitry may further determine whether the unsuccessful attempts have occurred as part of a same session, and/or whether the unsuccessful attempts have occurred within a threshold period of time from a current time. For example, as shown in FIG. 3, the mobile application may access log 300 of short-range wireless communication connection attempts to determine a number of reconnection attempts that have occurred recently as part of a particular session or same instance of attempting to establish communication between user device 238 and vehicle 206. In some embodiments, any suitable number of parameters (e.g., a number of time between reattempts, a total elapsed time of the reattempts session, whether an error code is received, and/or any other suitable data) may additionally or alternatively be determined at 408, to determine whether to proceed to 408. A negative determination at 406 may cause processing to return to 402 and wait for further instructions, and/or continue to perform reattempts. An affirmative determination at 406 may cause processing to proceed to 408.

At 408, the processing circuitry may generate second instructions including a modification to the wait time interval. For example, modification to the wait time interval included in the second instructions may comprise determining a randomized amount of time associated with the wait time interval. As another example, the modification to the wait time interval included in the second instructions comprises selecting a particular wait time interval from among a plurality (e.g., 3 or 4 or 5 any other suitable number) of predetermined wait time intervals. In some embodiments, the modification to the wait time interval included in the second instructions comprises increasing (e.g., by a certain interval, increasing the wait time interval for each modification, or by randomly increasing amounts) an amount of time associated with the wait time interval.

At 410, the processing circuitry determine whether the modified wait time interval (set at 408) has elapsed. If so, processing may proceed to 412; otherwise, processing remains at 410.

At 412, the processing circuitry may initiate the second instructions to establish the communication session between user device 238 and vehicle 206, e.g., after the modified wait time interval expires. Processing may proceed to 404, and provided a communication session is established between user device 238 and vehicle 206, process 400 may conclude. On the other hand, if the attempt based on the second instruction is unsuccessful, processing may return to 406 to begin processing for further modifying the wait time interval associated with a next attempt.

Figure 5:
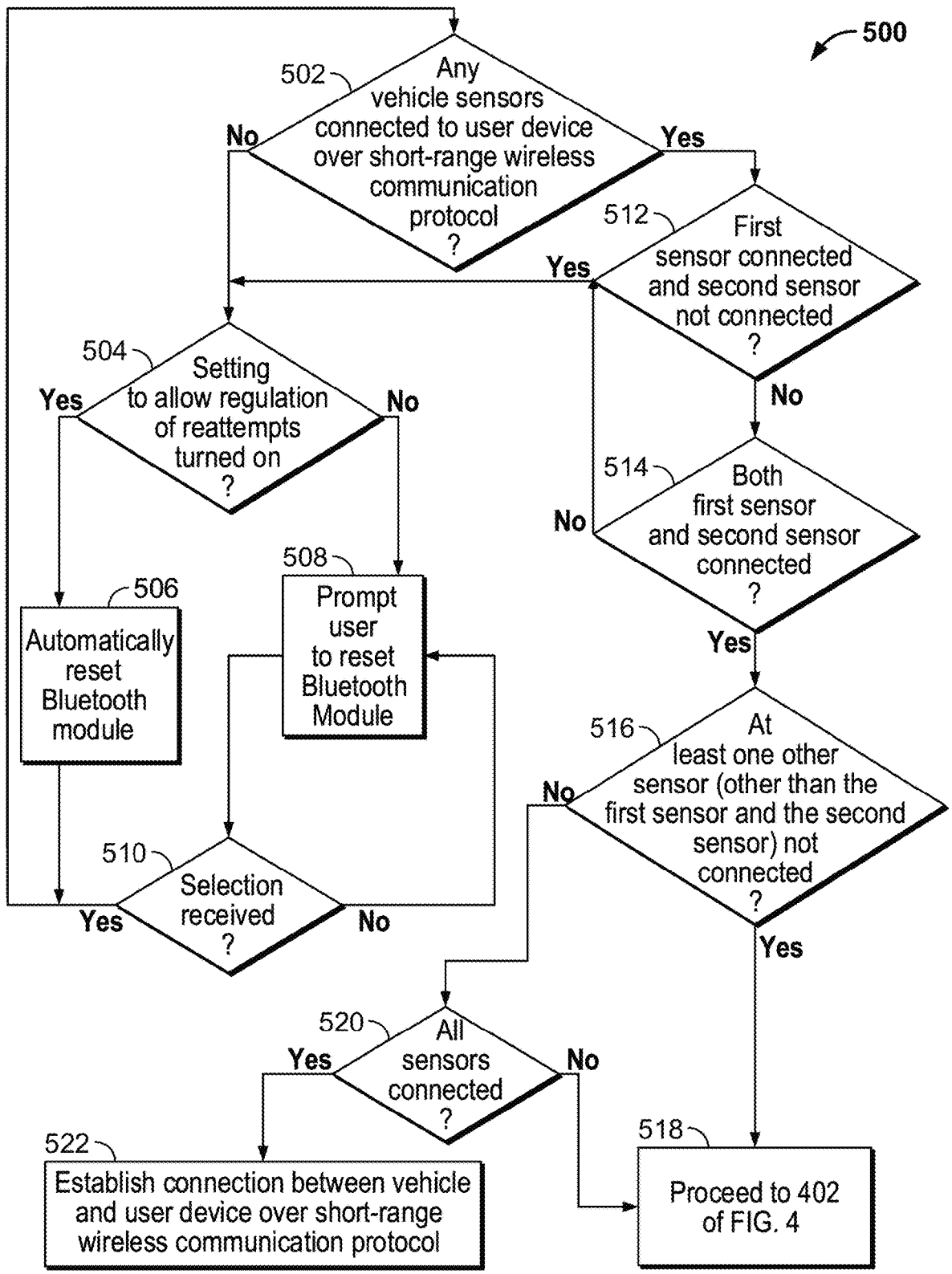
FIG. 5 shows a flowchart of illustrative process for establishing a communication session between a user device and a vehicle, in accordance with some embodiments of the present disclosure.

FIG. 5 shows a flowchart of illustrative process 500 for establishing communications between a user device and a vehicle, in accordance with some embodiments of the present disclosure. Process 500 may be executed at least in part by processing circuitry 216, processing circuitry 240 and/or server 236.

At 502, the processing circuitry may determine whether any vehicle sensors are connected to user device 238 over a short-range wireless communication protocol. For example, processing circuitry 240 of user device 238, which may be executing a client of the mobile application, may determine whether a first sensor, e.g., sensor 221, a driver's left front door sensor of vehicle 206 (or any other suitable sensor of vehicle 206) is connected to user device 238 over the short-range wireless communication protocol. Additionally or alternatively, processing circuitry 240 of user device 238 may determine whether a second sensor, e.g., sensor 223, a sensor in the center console of vehicle 206 (or any other suitable sensor of vehicle 206) is connected to user device 238 over the short-range wireless communication protocol. For example, any suitable number of sensors may be checked regarding whether such sensor(s) are connected via the short-range wireless communication protocol to user device 238. In some embodiments, the first sensor may correspond to sensor 223 and the second sensor may correspond to sensor 221, or vice versa. The determination at 502 may be performed based on data received from vehicle 206 (or data not received and expected to be received in the event of a successful connection, or data indicating the connection was unsuccessful such as, for example, an error code). An affirmative determination at 502 (e.g., determining at least one sensor of vehicle 206 is connected to user device 238 over the short-range wireless communication protocol) may cause processing to proceed to 512; otherwise processing may proceed to 504.

In some embodiments, there may be more than one connection (e.g., user device may be connected to sensor 221 and sensor 223) and/or the processing circuitry may expect that one or more sensors should be connected to user device 238 at certain times and/or in certain circumstances. For example, when a user enters vehicle 206 and is a driver, a sensor on the driver door and a sensor in the dashboard may be expected to be connected to user device 238. As another example, certain sensors may have a higher priority in that certain functions of vehicle 206 may not be possible or vehicle 206 may not be able to be driven, in the absence of such sensor (e.g., sensor 223) being connected to user device 238 by way of the short-range wireless communication protocol. In some embodiments, it may be desirable to look to more than one sensor's connectivity status in vehicle 206 to diagnose a particular connectivity issue and/or determine a course of remedial action that should be taken.

At 504, the processing circuitry may determine whether a setting to allow regulation of connection attempts and/or reattempts is turned on. Such setting may be turned on as a result of an explicit user input, or based on preferences of the user determined by monitoring the user's interactions with the mobile application and/or other suitable applications, or with vehicle 206, or any combination thereof. If such a setting is turned on, processing may proceed to 506; otherwise processing may proceed to 508. In some embodiments, 504 is optional.

At 506, the processing circuitry may determine to automatically reset (e.g., without requiring user input at a settings screen for a Bluetooth module) a Bluetooth module (or other communications module associated with a communications stack of the short-range wireless communication protocol) on his or her user device 238, in an effort to cause at least one sensor of vehicle 206 to be in communication with user device 238. At 508, the user may be prompted to reset such Bluetooth module on his or her user device 238, in an effort to cause at least one sensor of vehicle 206 to be in communication with user device 238. The prompt may correspond to any suitable notification, e.g., a push notification, an alert card, a snackbar, a toast or any other suitable notification may be used or any combination thereof). Upon receiving such selection (at 510) to reset the Bluetooth module, or performing the automatic reset (at 506), processing may return to 502.

At 512, the processing circuitry may determine whether first sensor 221 is connected and the whether the second sensor is not connected to vehicle 206 via the short-range wireless communication protocol. If first sensor 221 is connected and the second sensor is not connected, processing may return to 504. Otherwise, processing may proceed to 514.

At 514, the processing circuitry may determine whether both first sensor 221 and second sensor 223 are connected to vehicle 206 via the short-range wireless communication protocol. If no, processing may return to 504; otherwise processing may proceed to 516.

At 516, the processing circuitry may determine whether at least one other sensor of vehicle 206 (other than first sensor 221 and second sensor 223) is not connected to vehicle 206 via the short-range wireless communication protocol. If yes, processing may proceed to 518 corresponding to 402 of FIG. 4, to perform process 400. On the other hand, a negative determination at 516 may cause processing to proceed to 520. At 520, if all relevant vehicle sensors of vehicle 206 are determined not to be connected to vehicle 206 via the short-range wireless communication protocol, processing may proceed to 518 corresponding to 402 of FIG. 4, to perform process 400. On the other hand, if all relevant vehicle sensors of vehicle 206 are determined to be connected to vehicle 206 via the short-range wireless communication protocol, processing may proceed to 522. At 522, the processing circuitry may establish a connection between vehicle 206 and user device 238 over the short-range wireless communication protocol, e.g., with or without performing processing to modify the wait time interval.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A computer-implemented method comprising:
   initiating first instructions to establish a communication session between a user device and a vehicle, wherein the first instructions include a wait time interval and the communication session is associated with a short-range wireless communication protocol;
   determining a number of unsuccessful attempts for establishing the communication session exceeds a threshold value;
   in response to determining that the number exceeds the threshold value, generating second instructions to establish the communication session, wherein the second instructions include a modification to the wait time interval; and
   initiating the second instructions to establish the communication session between the user device and the vehicle.

2. The method of claim 1, wherein the modification to the wait time interval included in the second instructions comprises determining a randomized amount of time associated with the wait time interval.

3. The method of claim 1, wherein the modification to the wait time interval included in the second instructions comprises selecting a particular wait time interval from among a plurality of predetermined wait time intervals.

4. The method of claim 1, wherein the modification to the wait time interval included in the second instructions comprises increasing an amount of time associated with the wait time interval.

5. The method of claim 1, further comprising:
   accessing a log of short-range wireless communication connection attempts,
   wherein determining the number of unsuccessful attempts is performed based on the accessed log.

6. The method of claim 1, further comprising:
   determining that a vehicle sensor is not connected to the user device over the short-range wireless communication protocol; and
   in response to determining that the vehicle sensor is not connected to the user device over the short-range wireless communication protocol, automatically resetting a module associated with the short-range wireless communication protocol.

7. The method of claim 1, further comprising:
   determining that a vehicle sensor is not connected to the user device over the short-range wireless communication protocol; and
   in response to determining that the vehicle sensor is not connected to the user device over the short-range wireless communication protocol, generating for display a prompt requesting a user to select an option to reset a module associated with the short-range wireless communication protocol.

8. The method of claim 7, further comprising:
   monitoring user interactions with displayed prompts that request the user to select the option to reset the module associated with the short-range wireless communication protocol; and
   determining whether to provide, or a manner of providing, the displayed prompts based on the user interactions.

9. The method of claim 1, wherein the modification to the wait time interval included in the second instructions is further performed in response to determining that each of the unsuccessful attempts have occurred within a particular time period.

10. A computer-implemented system comprising:
    communications circuitry; and
    processing circuitry configured to:
       initiate first instructions to establish a communication session between a user device and a vehicle, wherein the first instructions include a wait time interval and the communication session is associated with a short-range wireless communication protocol;
       determine a number of unsuccessful attempts for establishing the communication session exceeds a threshold value;
       in response to determining that the number exceeds the threshold value, generate second instructions to establish the communication session, wherein the second instructions include a modification to the wait time interval; and
       initiate the second instructions to establish the communication session between the user device and the vehicle, wherein the communication session is established using the communications circuitry.

11. The system of claim 10, wherein the processing circuitry is configured to perform the modification to the wait time interval included in the second instructions by determining a randomized amount of time associated with the wait time interval.

12. The system of claim 10, wherein the processing circuitry is configured to perform the modification to the wait time interval included in the second instructions by selecting a particular wait time interval from among a plurality of predetermined wait time intervals.

13. The system of claim 10, wherein the processing circuitry configured to perform the modification to the wait time interval included in the second instructions by increasing an amount of time associated with the wait time interval.

14. The system of claim 10, wherein the processing circuitry is further configured to:
   access a log of short-range wireless communication connection attempts; and
   determine the number of unsuccessful attempts based at least in part on the accessed log.

15. The system of claim 10, wherein the processing circuitry is further configured to:
   determine that a vehicle sensor is not connected to the user device over the short-range wireless communication protocol; and
   in response to determining that the vehicle sensor is not connected to the user device over the short-range wireless communication protocol, automatically reset a module associated with the short-range wireless communication protocol.

16. The system of claim 10, wherein the processing circuitry is further configured to:
   determine that a vehicle sensor is not connected to the user device over the short-range wireless communication protocol; and
   in response to determining that the vehicle sensor is not connected to the user device over the short-range wireless communication protocol, generate for display a prompt requesting a user to select an option to reset a module associated with the short-range wireless communication protocol.

17. A non-transitory computer-readable medium having non-transitory computer-readable instructions encoded thereon that, when executed by a processor, causes the processor to:
   initiate first instructions to establish a communication session between a user device and a vehicle, wherein the first instructions include a wait time interval and the communication session is associated with a short-range wireless communication protocol;
   determine a number of unsuccessful attempts for establishing the communication session exceeds a threshold value;
   in response to determining that the number exceeds the threshold value, generate second instructions to establish the communication session, wherein the second instructions include a modification to the wait time interval; and
   initiate the second instructions to establish the communication session between the user device and the vehicle.

18. The non-transitory computer-readable medium of claim 17, wherein the processor is configured to perform the modification to the wait time interval included in the second instructions by determining a randomized amount of time associated with the wait time interval.

19. The non-transitory computer-readable medium of claim 17, wherein the processor is configured to perform the modification to the wait time interval included in the second instructions by selecting a particular wait time interval from among a plurality of predetermined wait time intervals.

20. The non-transitory computer-readable medium of claim 17, wherein the processor is configured to perform the modification to the wait time interval included in the second instructions by increasing an amount of time associated with the wait time interval.

* * * * *